United States Patent Office 3,366,586
Patented Jan. 30, 1968

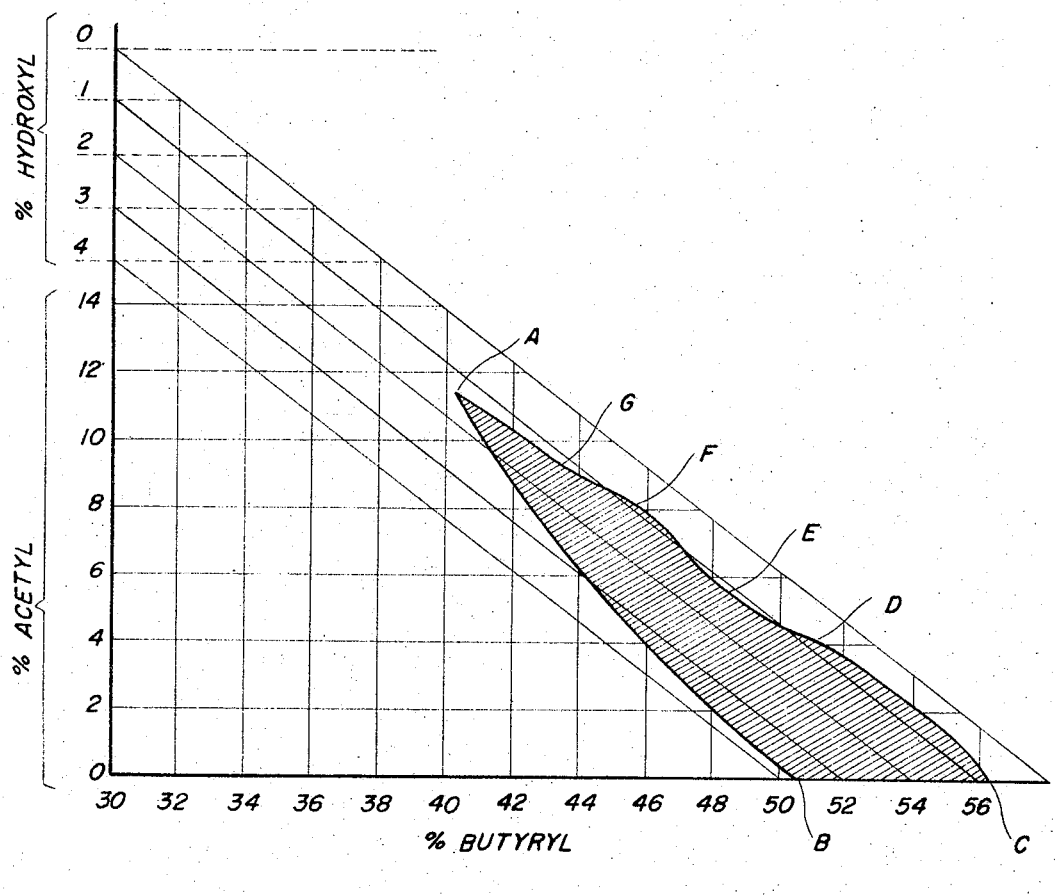

3,366,586
LACQUER COMPOSITION COMPRISING POLY-
METHYL METHACRYLATE AND CELLULOSE
ACETATE BUTYRATE
James D. Crowley and Jack W. Lowe, Jr., Kingsport,
Tenn., assignors to Eastman Kodak Company, Rochester, N.Y., a corporation of New Jersey
Filed Mar. 27, 1964, Ser. No. 355,313
5 Claims. (Cl. 260—17)

ABSTRACT OF THE DISCLOSURE

A lacquer coating composition curable at high temperatures without the occurrence of haze in films obtained therefrom comprising an organic solvent solution, poly(methyl methacrylate) and a cellulose acetate butyrate having butyryl, acetyl and free hydroxyl contents within the ranges designated in the cross-hatched area in the accompanying drawing.

---

This invention relates to lacquers, and more particularly to lacquers based on certain cellulose acetate butyrate and poly(methyl methacrylate) mixtures. It also relates to a method of obtaining clear coatings from these lacquers at high curing temperatures.

The advantages of lacquers based on cellulose acetate butyrate and poly(methyl methacrylate) are well known, having been disclosed in a technical brochure, "Half-Second Butyrate," published by Eastman Chemical Products, Inc., 1954. It is now desirable in many instances, particularly in the automotive industry which employs these lacquers for coating metal surfaces, to cure the coatings at elevated temperatures, such as about 300° F. However, the cellulose acetate butyrate and poly(methyl methacrylate) lacquers previously employed have exhibited an undesirable haze when cured at elevated temperatures. Hence, it appears desirable to provide modified lacquers based on cellulose acetate butyrate and poly(methyl methacrylate) which may be cured at high temperatures without the occurrence of the undesirable haze. It would also be highly desirable if such modified lacquers exhibited superior weathering properties, and if a wider variety of plasticizers could be used with these lacquers than has been possible heretofore.

One object of our invention is to provide lacquers based on cellulose acetate butyrate and poly(methyl methacrylate) mixtures which may be cured at high temperatures without the occurrence of undesirable haze in the film obtained. Another object of our invention is to provide lacquers based on cellulose acetate butyrate and poly(methyl methacrylate) mixtures which provide films having superior weathering properties. A further object of our invention is to provide lacquers based on cellulose acetate butyrate and poly(methyl methacrylate) mixtures which have characteristics such that a wide variety of plasticizers may be incorporated therein. Still another object of our invention is to provide a method for obtaining clear coatings of poly(methyl methacrylate) and cellulose acetate butyrate mixtures on various substrates by coating a solvent solution of the cellulose acetate butyrate and poly(methyl methacrylate) onto a substrate, and curing the coating at a high temperature. Other objects of our invention will appear herein.

We have found that known lacquers containing as the essential film formers cellulose acetate butyrate and poly(methyl methacrylate), which lacquers may also contain various modifiers such as plasticizers, ultraviolet inhibitors and pigments, show some degree of incompatibility. While this incompatibility is generally not apparent when the films are inspected after drying at low temperatures, a visible haze is readily apparent when such lacquers have been cured at elevated temperatures, such as 220–300° F. We have discovered that this incompatibility is not a function of the solvent, plasticizer, ultraviolet inhibitor or other modifier because clear films are obtained when cellulose acetate butyrate is omitted from the compositions. As a further indication that the cellulose acetate butyrate employed contributes to the incompatibility, we have found that hazy films are obtained at curing temperatures of about 300° F. even when the plasticizer and other modifiers are omitted, and only the cellulose acetate butyrate and poly(methyl methacrylate) are present in the lacquer.

We have now found that lacquer compositions based on poly(methyl methacrylate) and certain cellulose acetate butyrates, which cellulose esters have acetyl, butyryl and free hydroxyl contents as indicated in the cross-hatched area of the accompanying drawing, may be cured at elevated temperatures, such as 300° F., without the occurrence of undesirable haze. We have further found that coatings prepared from poly(methyl methacrylate) and the cellulose acetate butyrates in accordance with the invention exhibit outstanding gloss and gloss retention on outdoor weathering. The lacquers in accordance with our invention allow a wide selection of plasticizers.

The accompanying drawing, as indicated heretofore, is a graph containing a cross-hatched area which shows the useful range of acetyl, butyryl and free hydroxyl in the cellulose acetate butyrates which we have found to be useful in accordance with the invention.

Our invention will be further illustrated in the following examples. Example 1 demonstrates the need for employing in lacquers based on poly(methyl methacrylate) a cellulose acetate butyrate having acetyl, butyryl and hydroxyl contents falling within the cross-hatched area in the drawing.

EXAMPLE 1

A series of lacquers were formulated containing fifty parts of a commercially available lacquer grade poly(methyl methacrylate), 20 parts cellulose acetate butyrate and 30 parts butyl benzyl phthalate plasticizer. Each lacquer was the same except that the cellulose esters which were employed had varying acetyl, butyryl and free hydroxyl contents. A solvent solution of the plasticizer and polymers was formulated to obtain a 22% non-volatile solution. The solvent solution employed was composed of acetone, methyl ethyl ketone, toluene and ethylene glycol monoethyl ether acetate (see Journal of the Oil and Colour Chemists' Association, vol. 46, No. 11, November 1963, page 915 et seq.). Each lacquer formulated was cast as a 20-mil wet film on glass. The coated glass panels were flash-dried, force-dried for 30 minutes at 220° F., and then baked for 30 minutes at 300° F. Upon cooling, the panels were examined for compatibility under a strong light. The acetyl, butyryl and free hydroxyl content of the cellulose esters employed are shown in Tables I, II and III. In Table I below, all of the cellulose esters described therein provided a completely compatible film when incorporated in the lacquers, and no haze was apparent in the cured film.

TABLE I

| Percent Acetyl | Percent Butyryl | Percent Free Hydroxyl |
|---|---|---|
| 6.4 | 46.7 | 1.37 |
| 6.3 | 45.7 | 1.80 |
| 6.8 | 44.5 | 2.65 |
| 10.2 | 42.4 | 1.17 |
| 7.5 | 47.8 | 0.15 |
| 7.2 | 46.6 | 0.80 |
| 6.9 | 46.3 | 1.30 |
| 7.3 | 45.9 | 1.80 |
| 2.4 | 52.5 | 1.40 |
| 2.6 | 49.4 | 2.70 |
| 2.6 | 50.9 | 1.53 |
| 2.1 | 53.8 | 0.47 |
| 1.9 | 52.1 | 1.43 |
| 2.0 | 53.6 | 0.42 |
| 2.3 | 51.4 | 1.60 |
| 2.3 | 51.3 | 1.50 |

In the above table, the viscosity of the esters employed was from about 1.0 to 2.0 seconds as determined by ASTM Method D-1343-54T in the solution described as Formula A, ASTM Method D-871-54T. This method was used in determining the viscosity referred to throughout this description and in the appended claims.

In Table II below, commercially available cellulose esters are described with respect to their viscosity, acetyl, butyryl, and hydroxyl content. As noted above, all of these esters when incorporated in the lacquer composition demonstrated incompatibility with the poly(methyl methacrylate) upon high temperature curing in that the films obtained exhibited a visible haze.

TABLE II

| Viscosity | Percent Acetyl | Percent Butyryl | Percent Free Hydroxyl |
|---|---|---|---|
| 1.5-2.5 | 29.5 | 17 | 0.5 |
| 10-21 | 29.5 | 17 | 1.2 |
| 22-30 | 29.5 | 17 | 1.28 |
| 31-35 | 29.5 | 17 | 1.51 |
| 2.4-3.6 | 20.5 | 26 | 2.11 |
| 15-35 | 20.5 | 26 | 2.58 |
| 0.05-0.15 | 13 | 37 | 2.80 |
| 0.3-0.5 | 13 | 37 | 1.41 |
| 1-3.5 | 13 | 37 | 1.85 |
| 17-33 | 13 | 37 | 2.1 |
| 0.8-1.2 | 6 | 48 | 0.58 |
| 4-6 | 6 | 48 | 0.9 |

In the above table, the average acetyl and butyryl contents are given, and the approximate hydroxyl content is as indicated.

A variety of cellulose acetate butyrates were prepared having different acetyl, butyryl and hydroxyl contents. These esters are not commercially available, and are not included within the esters indicated in the cross-hatched area of the accompanying drawing. The lacquers prepared with these cellulose butyrates were incompatible in the lacquer of Example 1, when cured at high temperatures, as evidenced by the haziness of the films obtained. The cellulose esters employed are described in Table III.

TABLE III

| Percent Acetyl | Percent Butyryl | Percent Free Hydroxyl |
|---|---|---|
| 6.7 | 49.0 | 0.04 |
| 6.6 | 48.8 | 0.04 |
| 11.4 | 43.6 | 0.05 |
| 11.0 | 43.2 | 0.55 |
| 9.8 | 40.8 | 2.37 |
| 9.5 | 40.3 | 2.84 |
| 7.5 | 42.7 | 3.07 |
| 13.6 | 38.4 | 0.22 |
| 12.9 | 38.7 | 1.49 |
| 12.6 | 38.8 | 1.90 |
| 12.5 | 37.6 | 2.24 |
| 11.5 | 35.1 | 3.62 |
| 17.6 | 34.9 | 0.32 |
| 17.1 | 34.8 | 0.54 |
| 16.5 | 34.4 | 1.22 |
| 16.0 | 32.4 | 1.31 |
| 14.8 | 32.6 | 3.40 |

In the above table, the cellulose esters all had a viscosity of from about 1.0 to about 2.0 seconds.

The superior weatherability of the lacquers in accordance with our invention is demonstrated in Example 2.

EXAMPLE 2

Lacquers typical of the type employed in the automotive industry were prepared employing cellulose acetate butyrate esters in accordance with the invention, and those which are commercially available and have previously been used in such lacquers. The lacquers have the following composition:

TABLE IV

| | Lacquer A Wt. Percent | Lacquer B Wt. Percent |
|---|---|---|
| Cellulose acetate butyrate (13% acetyl, 37% butyryl and 1.85% hydroxyl) | 2.50 | |
| Cellulose acetate butyrate (42.4% butyryl, 10.2% acetyl, 1.17% hydroxyl) | | 2.50 |
| Poly(methyl methacrylate) | 3.75 | 3.75 |
| Pigment grind | 14.50 | 14.50 |
| Butyl benzyl phthalate | 3.75 | 3.75 |
| Acetone | 24.40 | 24.40 |
| Toluene | 32.40 | 32.40 |

In the above table, the pigment grind employed consisted of 6.2 parts by weight titanium dioxide, 2.5 parts poly(methyl methacrylate) and 5.8 parts ethylene glycol monoethyl ether acetate. The lacquer composition was ground in a pebble mill for 48 hours prior to addition to the lacquer base.

The gloss retention of the lacquers after coating on a test panel, as measured by a standards Atlas Twin Arc Weatherometer, was as follows:

GLOSS RETAINED, PERCENT

| Hours | Lacquer A | Lacquer B |
|---|---|---|
| 0 | 100 | 100 |
| 250 | 88 | 93 |
| 500 | 76 | 83 |
| 750 | 65 | 75 |
| 1,000 | 55 | 66 |

As may be seen from the foregoing data, there is a pronounced superiority in the gloss retention of films prepared from the lacquers in accordance with the invention over the lacquer of the prior art.

As noted heretofore, the particular cellulose acetate butyrate esters employed in accordance with our invention in lacquers based on cellulose acetate butyrate and poly(methyl methacrylate) provide lacquer compositions having improved compatibility. This compatibility provides superior clarity of films when the lacquers are cured at high temperatures; coatings which have improved weatherability; and, as shown in Example 3, allows the plasticizer to be selected from a wider variety of plasticizers than has heretofore been possible with lacquers based on cellulose acetate butyrate and poly(methyl methacrylate).

EXAMPLE 3

A series of two basic lacquers were prepared as in Example 1 except that different plasticizers were used. In the first series of lacquers, designated as lacquer A, a cellulose acetate butyrate containing about 13% acetyl, 37% butyryl and about 1.85% free hydroxyl was used, whereas in the second series, designated as lacquer B, the cellulose acetate butyrate contained 1.9% acetyl, 52.1% butyryl and 1.43% free hydroxyl. The lacquers containing the different plasticizers were tested as in Example 1, and rated with respect to the clarity of the film obtained. The rating is based on a number system from 0-10, 0 indicating a very hazy film and 10 being a very clear film, with the numbers in between designating equal gradations of the presence of haze. The results of the various plasticizers used are shown in Table V.

TABLE V

|  | Lacquer A | Lacquer B |
|---|---|---|
| Butyl benzyl phthalate | 8 | 10 |
| Decyl benzyl phthalate | 6 | 10 |
| Di-2-ethylhexyl phthalate | 8 | 10 |
| Butyl cyclohexyl phthalate | 7 | 9 |
| Butyl phthalyl butyl glycollate | 8 | 10 |
| Sucrose acetate isobutyrate | 8 | 8 |
| Dicyclohexyl phthalate | 9 | 10 |
| n-Cyclohexyl p-toluenesulfonamide | 9 | 10 |
| Bis(dimethyl benzyl) ether | 7 | 9 |
| Dibutyl phthalate | 9 | 10 |
| Methyl cyclohexylmethyl phthalate | 7 | 9 |

The cellulose esters which we employ in our invention preferably have a viscosity within the range of .5 to 30 seconds (as determined by the standard ASTM method). The most useful poly(methyl methacrylate) polymers are those having a molecular weight range of from about 50,000 to 110,000. As used herein, the term poly(methyl methacrylate) refers to homopolymers of methyl methacrylate and to copolymers of methyl methacrylate wherein a major portion of the molecule is formed from methyl methacrylate, and the minor portion (up to about 25% by weight) of a suitable copolymerizable monomer such as methacrylic acid, methylacrylamide, acrylonitrile, ethyl acrylate and the like.

In accordance with our invention, the cellulose acetate butyrate preferably is employed in ranges of from about 15 to 50 parts by weight per each 50 parts by weight poly(methyl methacrylate) polymer.

The lacquers of our invention may be applied to a wide variety of substrates, including metals, glass, wood and the like. The lacquers of the invention are particularly suitable in coating metal surfaces, and particularly metal automobile bodies. In such applications, it is frequently desirable to have a reflow temperature of from about 285–300° F. This may be easily obtained with the lacquers of our invention by adjusting the amount of cellulose ester and plasticizer in the lacquer.

The lacquers of our invention may contain various pigments, dyes, ultraviolet inhibitors and plasticizers in accordance with the teachings of the prior art. Particularly suitable plasticizers are the bis-methyl cyclohexylalkyl phthalates and the dibenzoate esters of diols such as 2,2,4-trimethyl pentanediol-1,3-dibenzoate and 2-ethyl-1,3-hexanediol dibenzoate.

This invention has been described in detail with particular reference to preferred embodiments thereof, but it will be understood that variations and modifications can be effected within the spirit and scope of the invention as described hereinabove and as defined in the appended claims.

We claim:

1. A lacquer coating composition comprising, in an organic solvent solution, poly(methyl methacrylate) and a cellulose acetate butyrate having butyryl, acetyl and free hydroxyl contents within the ranges designated in the cross-hatched area in the accompanying drawing.

2. A lacquer coating composition comprising, in an organic solvent solution, about 50 parts by weight of a lacquer grade poly(methyl methacrylate) and about 15–50 parts by weight of a cellulose ester having butyryl, acetyl and free hydroxyl contents within the range designated in the cross-hatched area in the accompanying drawing, said ester having a viscosity of from about .5 to 30 seconds.

3. An article comprising a substrate having a coating thereon essentially consisting of poly(methyl methacrylate) and about 15–50 parts, per each 50 parts poly(methyl methacrylate), of a cellulose acetate butyrate containing acetyl, butyryl and free hydroxyl contents within the range designated in the cross-hatched area in the accompanying drawing.

4. The method of obtaining a clear film essentially consisting of poly(methyl methacrylate) and cellulose acetate butyrate on a metal substrate which comprises:
   (a) forming an organic solvent solution containing about 50 parts by weight poly(methyl methacrylate) and from 15–50 parts by weight of a cellulose acetate butyrate having acetyl, butyryl, and hydroxyl contents within the range designated in the cross-hatched area in the accompanying drawing, and a viscosity of from .5 to 30 seconds;
   (b) coating the lacquer composition onto a metal substrate; and
   (c) driving off the solvents from the coated film and curing the film at a temperature of from 220° to 300° F.

5. A lacquer coating composition having a solvent portion and a film-forming portion, the film-forming portion essentially consisting of about 50 parts by weight poly(methyl methacrylate) having a molecular weight of about 50,000 to 110,000; about 20 parts by weight cellulose acetate butyrate containing about 1.9% acetyl, about 52.1% butyryl and about 1.43% free hydroxyl and about 30 parts by weight butyl benzyl phthalate; and, the solvent portion essentially consisting of a mixture of acetone, methyl ethyl ketone, toluene and ethylene glycol monoethyl ether acetate, which mixture is a solvent for the film-forming portion.

References Cited
UNITED STATES PATENTS 2,852,403   9/1958   Yaeger _____ 260—17
2,860,110   11/1958  Godshalk _____ 260—17

WILLIAM H. SHORT, *Primary Examiner.*

J. NORRIS, *Assistant Examiner.*